United States Patent
Jalil et al.

(10) Patent No.: US 8,134,970 B2
(45) Date of Patent: *Mar. 13, 2012

(54) METHOD AND SYSTEM FOR TRANSMITTING CONTENT IN A WIRELESS COMMUNICATION NETWORK

(75) Inventors: Rehan Jalil, San Jose, CA (US); Mustafa Ergen, Oakland, CA (US)

(73) Assignee: WiChorus Inc., San Jose, CA (US)

( * ) Notice: Subject to any disclaimer, the term of this patent is extended or adjusted under 35 U.S.C. 154(b) by 1101 days.

This patent is subject to a terminal disclaimer.

(21) Appl. No.: 11/951,342

(22) Filed: Dec. 6, 2007

(65) Prior Publication Data

US 2008/0273498 A1    Nov. 6, 2008

Related U.S. Application Data

(60) Provisional application No. 60/927,619, filed on May 4, 2007.

(51) Int. Cl.
*H04W 4/00* (2009.01)
(52) U.S. Cl. ......... 370/331; 455/436; 455/439; 455/442
(58) Field of Classification Search .................. 370/331, 370/332, 333
See application file for complete search history.

(56) References Cited

U.S. PATENT DOCUMENTS

| | | | |
|---|---|---|---|
| 6,385,454 B1 * | 5/2002 | Bahl et al. ............... | 455/450 |
| 6,907,501 B2 * | 6/2005 | Tariq et al. .............. | 711/118 |
| 7,237,031 B2 * | 6/2007 | Cheng ..................... | 709/230 |
| 7,260,070 B1 | 8/2007 | Smith | |
| 2002/0067706 A1 | 6/2002 | Bautz et al. | |
| 2003/0009576 A1 * | 1/2003 | Apostolopoulos et al. ... | 709/231 |
| 2004/0010593 A1 | 1/2004 | Apostolopoulos et al. | |
| 2004/0073596 A1 * | 4/2004 | Kloninger et al. ........... | 709/200 |
| 2008/0310365 A1 | 12/2008 | Ergen et al. | |

OTHER PUBLICATIONS

Office Action for U.S. Appl. No. 11/937,507; Mail Date: Nov. 23, 2010.

Final Office Action for U.S. Appl. No. 11/937,507; Mail Date: Apr. 13, 2011.

\* cited by examiner

*Primary Examiner* — Jeffrey Pwu
*Assistant Examiner* — Abdelnabi Musa
(74) *Attorney, Agent, or Firm* — Hamilton, Brook, Smith & Reynolds, P.C.

(57) ABSTRACT

The present invention provides methods and systems for transmitting content in a wireless communication network. The method includes caching a content in each base station of a set of base stations in the wireless communication network. The content includes a plurality of packets. In response to caching the content, a first base station belonging to the set of base stations transmits a first group of packets of the content to a mobile station. The method further includes handing over the mobile station to a second base station. The second base station belongs to the set of the base stations. The second base station resumes transmission of a second group of packets of the content to the mobile station.

16 Claims, 4 Drawing Sheets

METHOD AND SYSTEM FOR TRANSMITTING CONTENT IN A WIRELESS COMMUNICATION NETWORK

RELATED APPLICATIONS

Benefit is claimed under 35 U.S.C. 119(e) to U.S. Provisional Application Ser. 60/927,619, entitled "Method and System for caching in mobile access service network" by Rehan Jalil et al., filed on May 4, 2007 which is herein incorporated in its entirety by reference for all purposes.

FIELD OF THE INVENTION

The present invention is generally related to wireless communication networks and more particularly, to transmitting content in a wireless communication network.

BACKGROUND OF THE INVENTION

Wireless communication networks are widely deployed to provide various types of communication such as voice, data and so on, for a number of users. The wireless communication networks are typically based on code division multiple access systems (CDMA), time division multiple access (TDMA), frequency division multiple access (FDMA), Orthogonal frequency division multiplexing (OFDM) or Orthogonal Frequency Division Multiple Access (OFDMA). For instance, Global system for mobile communications (GSM) is based on TDMA. Similarly, Worldwide Interoperability for Microwave Access (WiMAX), 3GPP Long term evolution (LTE) and 3GP22. Ultra Mobile Broadband is based on Orthogonal Frequency Division Multiplexing Access (OFDMA).

In a Worldwide Interoperability for Microwave Access (WiMAX) communication network a Mobile Access Service Network (MASN) forms the radio access network. The MASN refers to a set of network functions that provide connectivity services in form of Internet Protocol (IP) packets to mobile stations in the WiMAX network. Typically, the connectivity services include, but are not limited to, video streaming, vehicle tracking, file sharing, multi-media games, news and web browsing.

Typically, a wireless communication network includes a plurality of base stations, a plurality of mobile stations, one or more central controllers, one or more home agents and one or more content servers together with Authentication, Authorization and Accounting (AAA), Dynamic Host configuration Protocol (DHCP), Policy server etc. A set of base stations is usually associated with a central controller. For instance, Access Service Network Gateway (ASN-GW) functions as the central controller in a WiMAX network. Similarly, Mobility Management Unit (MMU) and Signaling Gateway (SGW) function as the central controller in the LTE network. The central controller communicates with the associated base stations to provide various connectivity services and transmits data in form of IP packets. For instance, a mobile station may request for radio access from a base station. In response to the request, the base station may communicate with the central controller to receive the relevant IP packets. The central controller can fetch the IP packets from the home agent or the content server before transmitting the IP packets to the base station. Thereafter, the base station transmits the IP packets to the mobile station requesting the radio access. Additionally, in some configurations, central controller may include a radio related component and a data related component which may be physically located apart from each other. Thereby, an IP packet may be routed from the content server through three intermediate routing points: the home agent, the central controller and the base station before transmission to the mobile station.

A transmission link between two successive routing points in the wireless communication network has a transmission cost associated with it. Typically, a transmission link connecting the content server and the home agent has the least transmission cost. However, the transmission cost increases as the IP packet is transmitted from the content server through each of the routing points to the mobile station. Consequently, the transmission link between the base station and the central controller may have a higher cost associated with it as compared to the transmission link between the home agent and the central controller, which, in turn may have a higher cost associated with it as compared to the transmission link between the home agent and the content server.

A mobile station in the wireless communication network may frequently undergo handover from a first base station to a second base station as it moves from the current cell area to any of the neighboring cell areas. In the existing methods, during the handover, the mobile station stops receiving the content from the first base station and the mobile station tries to retrieve the content from the second base station. Therefore, the second base station transmits one or more packets of the content irrespective of the content previously transmitted from the first base station to the mobile station. Thereby adding to the transmission cost associated with the link between the mobile station and the base station.

Further, during handover from the first base station to the second base station, transmission of a content to the mobile station may be paused. The reason for pausing of the transmission may be due to the unavailability of the content on the second base station. In such cases, the transmission is started once the content is fetched on the second based station. However, the pausing of the transmission may result in an undesirable quality of services (QoS). For instance, during music streaming or video streaming any pausing during streaming can disturb the continuity of the streaming and thereby reduce the QoS of streaming.

Additionally, the second base station may retrieve the requested content from the central controller, the home agent or the content server, after the handover, thus increasing latency in transmitting the content to the mobile station. Further, the mobile station may have to buffer the content already received from the first base station, before receiving the subsequent content. This may result in high transmission costs and may also cause the mobile station to experience a significant latency in receiving the content.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a representative basis for teaching one skilled in the art to variously employ the present invention in virtually any appropriately detailed structure. Further, the terms and phrases used herein are not intended to be limiting but rather to provide an understandable description of the present invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly and not necessarily mechanically.

Generally speaking, pursuant to various embodiments, the present invention provides a method and system for transmitting content in a wireless communication network. The wireless communication network may be, but is not limited to, a Mobile Access Service Network (MASN). The wireless communication network includes a plurality of base stations and a plurality of mobile stations. At a given point in time, one or more mobile stations may be associated with one or more base stations in the wireless communication network. Specifically, a mobile station can establish communication in the wireless communication network by associating with a base station. The mobile station may request content from the base station. The present invention provides a method for transmitting content at one or more base stations, such that the transmission costs and the latency associated with acquiring the content are reduced. The method and system for transmitting content in the wireless communication network are explained in detail in conjunction with FIG. 1 to FIG. 4 below.

Figure 1:
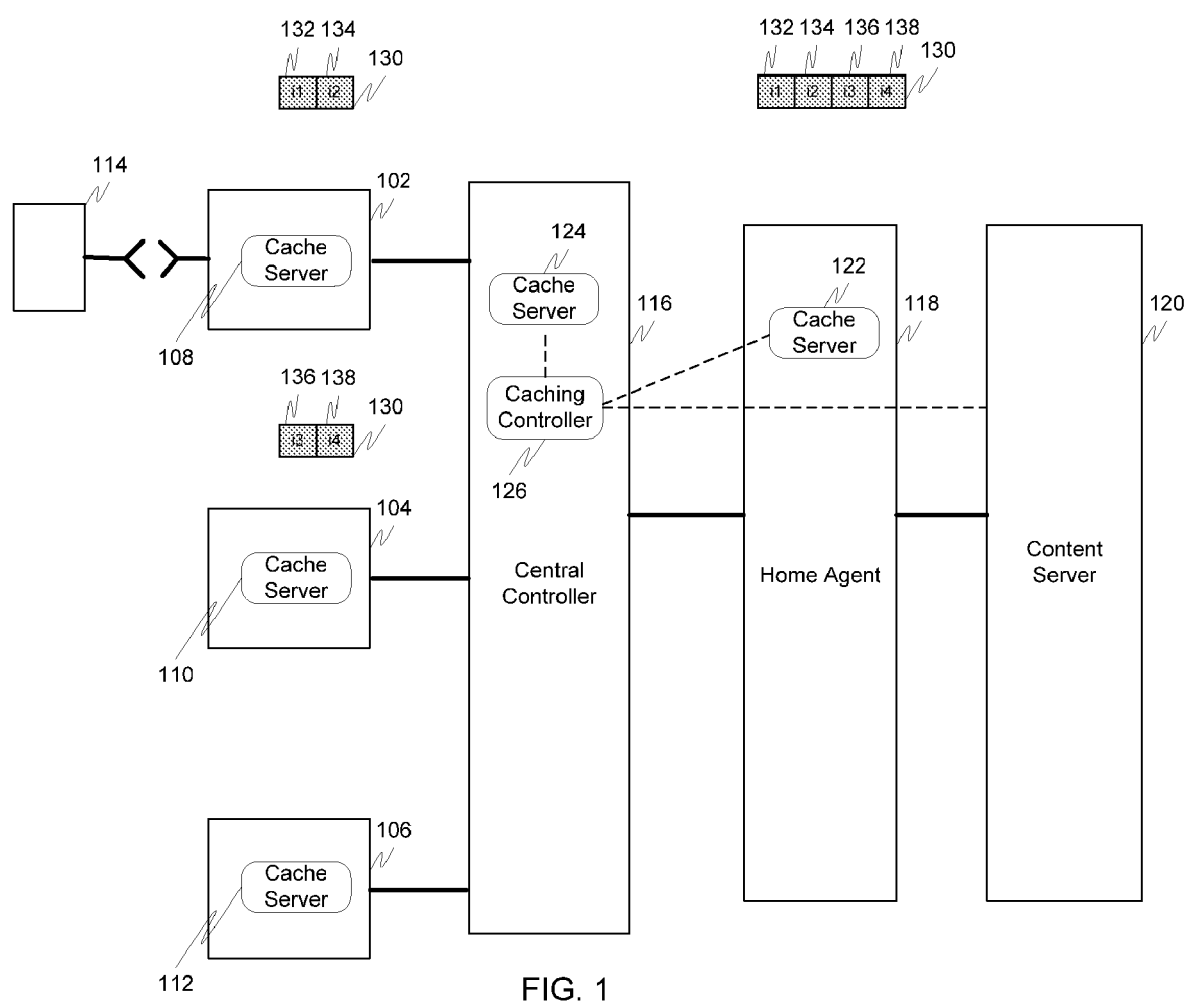
FIG. 1 is a block diagram showing an environment in which various embodiments of the present invention can function.

Referring now to drawings and more specifically to FIG. 1, a block diagram of an environment 100 in which various embodiments of the present invention can function is shown. Environment 100 includes a set of base stations for providing connectivity services to a plurality of mobile stations in environment 100. The set of base stations includes a base station 102, a base station 104 and a base station 106. The connectivity services may be for example, but are not limited to, telephony, media streaming, location tracking, file sharing, multi-media games, news and web browsing. Those skilled in the art, however, will recognize and appreciate that the specifics of this illustrative example are not specifics of the present invention itself and that the teachings set forth herein are applicable in a variety of alternative settings. For example, since the teachings described do not depend on the number or type of mobile stations, base stations and defined environments, they can be applied to any number or any type of mobile stations, base stations and defined environments although only three base stations and a mobile station are shown in this embodiment.

In accordance with an embodiment of the present invention, a base station in the environment 100 may include a cache server. The cache server is used for caching content. For instance, as depicted in FIG. 1, base station 102 includes a cache server 108, base station 104 includes a cache server 110 and base station 106 includes a cache server 112.

Environment 100 further includes a plurality of mobile stations associated with base station 102, base station 104 or base station 106. One of the mobile stations associated with base station 102 is depicted as a mobile station 114. Mobile station 114 can be for example, a mobile phone, a laptop, a personal digital assistant (PDA), or any device which is compatible with the wireless communication network. As depicted, mobile station 114 is associated with base station 102 to receive and transmit IP packets.

Environment 100 can further include a central controller 116, a home agent 118 and a content server 120. Content server 120 may include content that may be requested by the plurality of mobile stations in environment 100. Home agent 118 may include a cache server 122 for caching content retrieved from content server 120. Additionally, central controller 116 may also include a cache server 124 for caching content that may be retrieved from home agent 118 or from content server 120. In an embodiment, central controller 116 may further include a caching controller 126 for controlling cache server 124. In an embodiment of the present invention, caching controller 126 may be located outside central controller 116.

In an embodiment of the present invention, mobile station 114 may request base station 102 for content. For instance, mobile station 114 may request for or may be subscribed to receive media content. In accordance with the present invention, upon receiving the request, base station 102 may retrieve the content from one or more of central controller 116, home agent 118 and content server 120. In an embodiment, base station 102 can cache the content partially, upon receiving the request. The content may be cached in cache server 108. In an embodiment, the content may also be cached at base station 104 or base station 106, upon receiving the request at base station 102. The method for transmitting the content to mobile station 114 is explained in detail in conjunction with FIG. 2 to FIG. 4 below.

Figure 2:
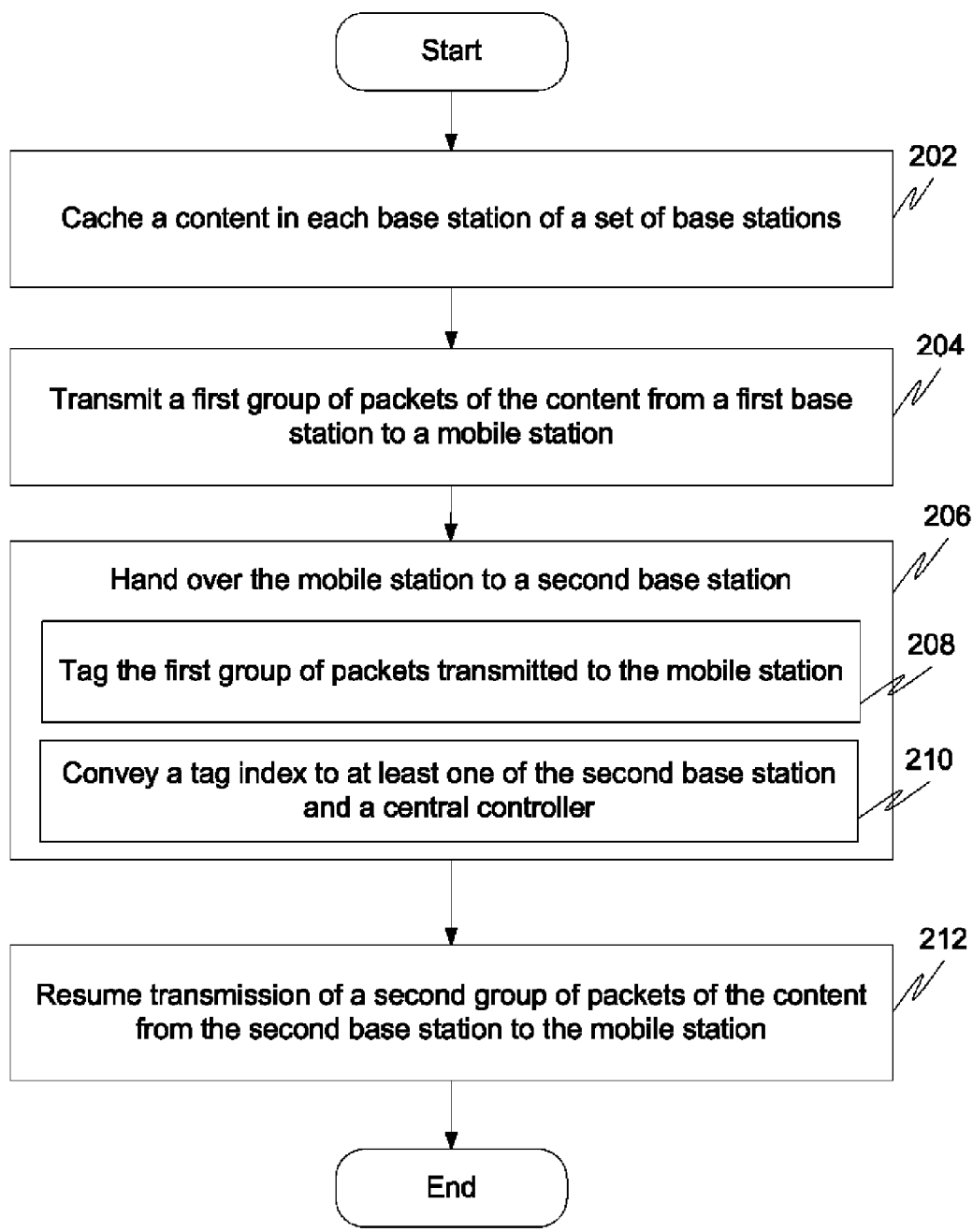
FIG. 2 is a flow diagram of a method for transmitting a content in a wireless communication network, in accordance with an embodiment of the present invention.

Turning now to FIG. 2, a flow diagram of a method for transmitting content in a wireless communication network is shown, in accordance with an embodiment of the present invention. As depicted in FIG. 1, mobile station 114 is associated with base station 102 for availing connectivity services.

Each base station of the set of base stations, including base station 102, base station 104 and base station 106, caches a content at step 202. The content may include a plurality of packets. The content may be for example, but not limited to, a media file, a text file, an HTML file, a binary file, a compressed file, an ASCII file and a web content.

In an embodiment of the present invention, the set of base stations may be identified based on an area in which mobile station 114 may roam for a predetermined time period. For instance, central controller 116 may identify base station 102, base station 104 and base station 106 based on an estimated trajectory of mobile station 114. The estimated trajectory may indicate the cell areas that can be visited by mobile station 114. The cell areas may be predicted based on previously visited cell areas by mobile station 114. In an embodiment of the present invention, the set of base stations may also be identified based on a historical data of one or more of mobile station 114, base station 102, base station 104 and base station 106. For instance, historical data of mobile station 114 may identify one or more probable cell areas adjacent to the cell area of base station 102 which mobile station 114 may visit. In another embodiment of the present invention, the set of base stations may include candidate base stations of mobile station 114.

In an embodiment, the content may be cached at the set of base stations in response to receiving a request for the content from mobile station 114. In another embodiment, the content may be a popular content and may be pre-fetched at the set of base stations. The content may be identified as the popular content based on a number of requests for the content from the plurality of mobile stations in environment 100. In another embodiment of the present invention, the content may be pre-fetched at the set of base stations, if the content is usually requested by one or more mobile stations. Alternatively, the base stations may pre-fetch the content based on a predetermined broadcast time for the content. The content may be, but not limited to, news, multi-media games, web logs, subscription services, horoscopes, music streaming, video streaming, electronic mails, electronic commerce services, location information services and ring tones. Referring back to FIG. 1, base station 102, base station 104 and base station 106 can cache a content 130. In an embodiment of the present invention, content 130 may be a fragment of a content present in content server 120.

Content 130, as depicted in FIG. 1, includes a packet 132, a packet 134, a packet 136 and a packet 138. It will be apparent to those skilled in the art that content 130 can include any number of packets although only four packets are depicted in FIG. 1 for the purpose of explanation.

The set of base stations, including base station 102, base station 104 and base station 106 cache content 130 in cache server 108, cache server 110 and cache server 112 respectively. The set of base stations can retrieve content 130 from cache server 108 of central controller 116, cache server 122 of home agent 118 or content server 120. For instance, the set of base stations may retrieve content 130 from cache server 124. If content 130 is absent at cache server 124, caching controller 126 may, in turn request cache server 122 of home agent 118 for content 130. If content 130 is available on cache server 122, caching controller 126 retrieves content 130 and transmits it to the set of base stations. Additionally, caching controller 126 may cache content 130 in cache server 124.

However, if content 130 is not present on cache server 122, caching controller 126 may request content server 120 for content 130. Thereby, content 130 may be routed through the intermediate routing points, but not limited to, home agent 118 and central controller 116 before content 130 is cached at cache servers of the set of base stations.

In response to caching content 130, base station 102 may assign a plurality of indices to the plurality of packets of content 130. An index assigned by base station 102 to a packet of content 130 may correspond to a sequence number of the packet in content 130. For instance, base station 102 caches packet 132 and assigns an index 'i1' to packet 132. Similarly, base station 102 assigns an index 'i2' to packet 134, an index 'i3' to packet 136 and an index 'i4' to packet 138. Those skilled in the art would realize that base station 104 and base station 106 can similarly cache content 130 and assign the plurality of the indices to the plurality packets of content 130.

Thereafter, at step 204, base station 102 transmits a first group of packets of content 130 to mobile station 114. For instance, the first group of packets can include packet 132 and packet 134. However, before base station 102 can transmit packet 136 and packet 138, mobile station 114 may roam from a cell area of base station 102 to a neighboring cell area. The neighboring cell area may be covered by another base station belonging to the set of base stations. Another base station may be, for instance, base station 104. While roaming, mobile station 114 may undergo a handover from base station 102 to base station 104.

Upon identifying the movement of mobile station 114 to the cell area of base station 104, base station 102 initiates a handover of mobile station 114 to base station 104 at step 206. In response to initiating the handover, base station 102 can stop transmission of remaining portion of content 130. Thereby, base station 102 can transmit content 130 partially only as long as mobile station 114 is present in the cell area of base station 102.

Further, during the initiation of the handover, base station 102 can tag, at step 208, the first group of packets transmitted to mobile station 114 using a tag index. The tag index can correspond to an index of a last packet of the first group of packets transmitted to mobile station 114. For instance, base station 102 can mark a tag index to index 'i2' corresponding to packet 134, if packet 132 and packet 134 are transmitted to mobile station 114 before the initiation of the handover.

Thereafter, base station 102 conveys the tag index to central controller 116 or directly to base station 104 at step 210. In the embodiment in which the tag index is transmitted to central controller 116, central controller 116 may forward the tag index to base station 104.

Upon receiving the tag index of the last packet transmitted by base station 102, base station 104 can determine a second group of packets of content 130, which is not transmitted to mobile station 114. Thereafter, base station 104 resumes transmission of the second group of packets of content 130 to mobile station 114 at step 212. For instance, base station 104 receives tag index corresponding to index 'i2' from base station 102. Base station 104 uses the index 'i2' corresponding to packet 134 to identify the second group of packets subsequent to packet 134 in content 130. Base station 104 then only transmits the second group of packets of content 130, which are not transmitted to mobile station 114 by base station 102. The second group of packets includes packet 136 and packet 138. Thereby, base station 104 transmits content 130 partially and does not transmit the first group of packets of content 130 that are already transmitted to mobile station 114. This reduces the transmission cost of the communication links and the transmission latency.

In an embodiment of the present invention, base station 104 may retrieve from cache server 124 of central controller 116, cache server 122 of home agent 118 or content server 120, if content 130 is absent at base station 104. In an embodiment, base station 104 can retrieve content 130 from base station 102.

Those skilled in the art would realize that, if mobile station 114 moves into a cell area of base station 106 before the transmission of content 130 is complete, the transmission may be resumed in a similar manner by base station 106.

Figure 3:
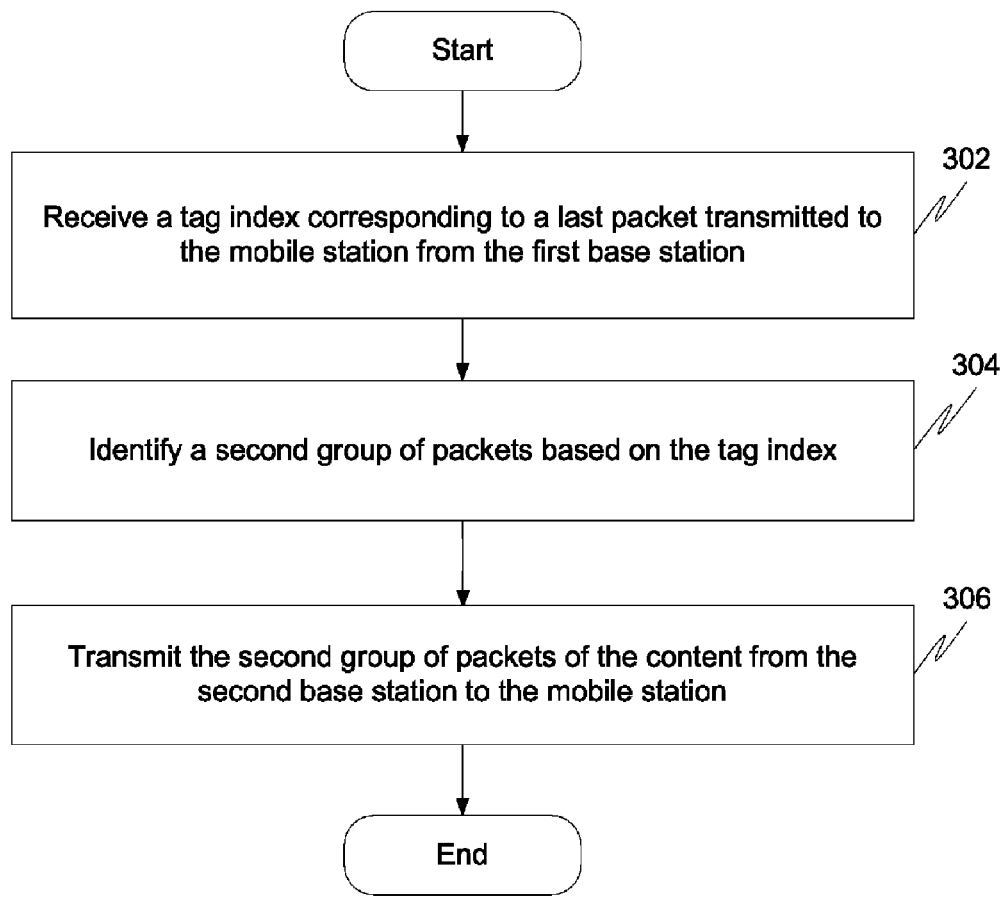
FIG. 3 is a flow diagram of a method for transmitting a content to a mobile station in response to a handover of the mobile station, in accordance to an embodiment of the present invention.

FIG. 3 is a flow diagram of a method for transmitting a content to a mobile station in response to a handover of the mobile station in a wireless communication network, in accordance to an embodiment of the present invention. As described in conjunction with FIG. 2, base station 102 caches content 130. Content 130 may be cached in response to a request from mobile station 114, or may be pre-fetched if content 130 is, for instance, a popular content. Content 130 may also be cached at the set of base stations including base station 104 and base station 106.

Further, base station 102 indexes the plurality of packets of content 130. Base station 102 transmits the first group of packets of content 130 to mobile station 114. For instance, the first group of packets may include packet 132 and packet 134. Before transmission of packet 136 and packet 138, mobile station 114 may move from the cell area of base station 102 to the cell area of base station 104. Upon identifying the movement of mobile station 114 to cell area of base station 104, base station 102 initiates the handover of mobile station 114 to base station 104.

During the initiation of the handover, base station 102 tags the first group of packets transmitted to mobile station 114 using a tag index. Subsequently, base station 102 may convey the tag index directly to base station 104 or to central controller 116. In the embodiment in which the tag index is transmitted to central controller 116, central controller 116 can forward the tag index to base station 104.

Referring back to FIG. 3, base station 104 receives the tag index from base station 102 at step 302. As mentioned earlier, the tag index may correspond to an index of a last packet transmitted to mobile station 114. For instance, base station 102 mark a tag index to index 'i2' corresponding to packet 134, as packet 134 is the last packet transmitted to mobile station 114 before the initiation of the handover.

Those skilled in the art will realize that the packets already transmitted to mobile station 114 may be identified by methods other than tag indices and all such methods are within the scope of the present invention.

Upon receiving the tag index, base station 104 identifies, at step 304, the second group of packets, which is not transmitted to mobile station 114, based on the tag index. The second group of packets includes one or more packets subsequent to packet 134 in content 130. Thus, base station 104 uses the index 'i2' corresponding to packet 134 to identify packet 136 and packet 138, subsequent to packet 134.

Thereafter, at step 306, base station 104 transmits the second group of packets of content 130, including packet 136 and packet 138, to mobile station 114. Thereby, base station 104 transmits the content 130 partially and does not transmit the first group of packets of content 130 that are already transmitted to mobile station 114. This helps lower the latency of transmission to mobile station 114 and may also reduce the transmission cost of a communication link between base station 104 and mobile station 114.

Figure 4:
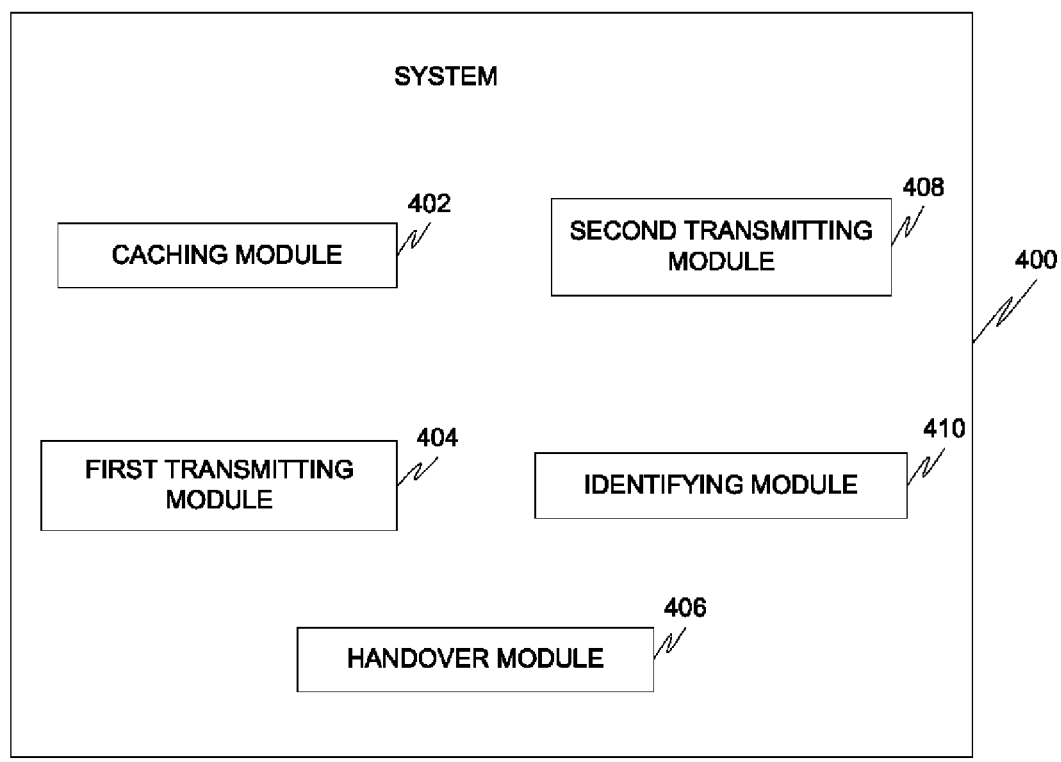
FIG. 4 is a block diagram of a system for transmitting a content in a wireless communication network, in accordance with an embodiment of the present invention.

Turning now to FIG. 4, a block diagram of a system 400 for transmitting content in a wireless communication network is shown, in accordance with an embodiment of the present invention. System 400 includes a caching module 402 and a first transmitting module 404. Caching module 402 and first transmitting module 404 may be located in, for instance, base station 102. In an embodiment of the present invention, caching module 402 is the same as cache server 108 of base station 102. Similarly, caching module 402 may also reside on the set of base station, including base station 104 and base station 106.

Initially, caching module 402 caches content 130 in base station 102. Content 130 includes a plurality of packets, such as packet 132, packet 134, packet 136 and packet 138. Content 130 may be for example, but not limited to at least one of a media file, a text file, a binary file, an ASCII file, an HTML file, a binary file, a compressed file, an ASCII file and a web content.

Content 130 may be cached in response to a request from mobile station 114, or may be pre-fetched at the set of base stations in the wireless communication network. Content 130 may be pre-fetched, if, for instance, content 130 is a popular content on the internet. For instance, the popular content may be, but not limited to, multimedia content, news, games, web logs, subscription services, horoscopes, electronic mails, electronic commerce services, location information services, or ring tones. Additionally, in an embodiment of the present invention, content 130 may not be an entire content, but only a fragment of the entire content present in content server 120.

Content 130 may be located at content server 120. However, one or more packets of content 130 may also be cached at cache server 124 of central controller 116, cache server 122 of home agent 118, cache server 108 of base station 102, cache server 110 of base station 104 and/or cache server 112 of base station 106.

Caching module 402 may retrieve content 130 from one or more of central controller 116, home agent 118 and content server 120. For instance, caching module 402 may retrieve content 130 from cache server 124. If content 130 is absent at cache server 124, caching module 402 may, in turn request cache server 122 of home agent 118 for content 130. If content 130 is available on cache server 122, caching module 402 retrieves content 130 and transmits it to base station 102. Additionally, caching module 402 may cache content 130 in cache server 124.

However, if content 130 is not present on cache server 122, caching module 402 may request content server 120 for content 130. Thereby, content 130 may be routed through the intermediate routing points, but not limited to, home agent 118 and central controller 116 before content 130 is cached at cache server 108.

Upon caching content 130, caching module 402 may assign a plurality of indices to the plurality of packets of content 130. An index assigned by caching module 402 to a packet of content 130 may correspond to a sequence number of the packet in content 130. For instance, caching module 402 caches packet 132 and assigns an index 'i' to packet 132. Similarly, caching module 402 assigns index 'i2' to packet 134, index 'i3' to packet 136 and index 'i4' to packet 138. However, embodiments of the present invention may use any other method known in the art for indexing.

After caching module 402 caches content 130, first transmitting module 404 transmits the first groups of packets of content 130 to mobile station 114. For instance, the first group of packets may include packet 132 and packet 134. However, before first transmitting module 404 can transmit packet 136 and packet 138, mobile station 114 may move from a cell area of base station 102 to a cell area of base station 104.

A handover module 406 initiates a handover of mobile station 114 from base station 102 to base station 104, upon detecting the movement of mobile station 114. In response to initiating the handover, first transmitting module 404 can stop transmission of remaining portion of content 130, if any. Thereby, first transmitting module 404 transmits content 130 partially only as long as mobile station 114 is present in the cell area of base station 102.

Further, handover module 406 can tag the first group of packets transmitted to mobile station 114 using a tag index. The tag index may correspond to an index of a last packet transmitted to mobile station 114. For instance, handover module 406 can mark a tag index to index 'i2' corresponding to packet 134, if packet 132 and packet 134 are transmitted to mobile station 114 before the initiation of the handover.

Thereafter, handover module 406 can convey the tag index to central controller 116 or directly to base station 104. In the embodiment in which the tag index is conveyed to central control 116, central controller 116 can forward the tag index to the base station 104.

Upon receiving the tag index of the last packet transmitted to mobile station 114, a second transmitting module 408 of base station 104 determines a second group of packets of content 130, which is not transmitted to mobile station 114. Thereafter, second transmitting module 408 resumes transmission of the second group of packets of content 130 to mobile station 114. For instance, second transmitting module 408 receives index 'i2'. Second transmitting module 408 uses the index 'i2' corresponding to packet 134 to identify the second group of packets subsequent to packet 134 in content 130. Consequently, second transmitting module 408 can identify packet 136 and packet 138 as the second group of packets that are not transmitted to mobile station 114. Second transmitting module 408 can, then, only transmit packet 136 and packet 138 of content 130 to mobile station 114. Thereby, second transmitting module 408 transmits content 130 partially and does not transmit the first group of packets of content 130 that are already transmitted to mobile station 114. This enables reduction of transmission cost of the communication link between mobile station 114 and base station 104.

System 400 can further include an identifying module 410 for identifying the set of base stations in the wireless communication network. In an embodiment of the present invention, identifying module 410 may identify an area in which mobile station 114 may roam for a predetermined time period. For instance, identifying module 410 may identify base station 104 and base station 106 as belonging to the set of base stations, based on an estimated trajectory of mobile station 114. The estimated trajectory may indicate the cell areas to be visited by mobile station 114, which may be predicted based on previously visited cell areas by mobile station 114. Identifying module 410 may also, identify the set of base stations based on a historical data of one or more of mobile station 114, base station 102, base station 104 and base station 106. For instance, identifying module 410 may use historical data of mobile station 114 to identify one or more probable cell areas adjacent to the cell area of base station 102 which mobile station 114 may visit. The set of base station may include the candidate base stations of mobile station 114.

In an embodiment of the present invention, identifying module 410 may communicate with central controller 116, which, in turn, may proactively distribute content 130 to base station 104 and base station 106 based on, but not limited to, the estimated trajectory of mobile station 114, signal strength from mobile station 114 and/or a historical data of at least one of mobile station 114, base station 102 and base station 104.

The pre-fetching of content and partial transmission of content in the wireless communication network, as described in the present invention, facilitates reduction of transmission costs. Further, the content may also be cached at cache server 124 of central controller 116 and/or cache server 122 of home agent 118. This obviates the need to retrieve content 130 from content server 120, each time a request for content 130 is received at a base station.

Various embodiments of the present invention provide a method and system for transmitting content in a wireless communication network. Further, the various embodiments of the present invention provide methods and system for optimizing transmission cost in the wireless communication network. In addition, the various embodiments of the present invention provide a method and system for reducing latency in the wireless communication network.

The invention claimed is:

1. A method for transmitting content in a wireless communication network, the method comprising:
    caching a content in each base station of a set of base stations in the wireless communication network, the content comprising a plurality of packets;
    transmitting a first group of packets of the content from a first base station to a mobile station, the first base station belonging to the set of base stations, the first group of packets belonging to the plurality of packets;
    handing over the mobile station to a second base station, the second base station belonging to the set of base stations;
    based upon handing over the mobile station to the second base station, tagging the first group of packets transmitted to the mobile station and conveying a tag index to at least the second base station, the tag index corresponding to an index of a last packet of the first group of packets transmitted to the mobile station; and
    resuming transmission of a second group of packets of the content from the second base station to the mobile station, the second group of packets belonging to the plurality of packets.

2. The method of claim 1, wherein caching the content comprises assigning a plurality of indices to the plurality of packets of the content, wherein an index of a packet corresponds to a sequence number of the packet in the plurality of packets.

3. The method of claim 1, wherein conveying the tag index includes sending the tag index to a central controller; and forwarding the tag index from the central controller to at least the second base station.

4. The method of claim 1, further comprising identifying the group of second packets subsequent to the group of first packets based on the tag index.

5. The method of claim 1, further comprising retrieving the content from at least one of the first base station, a central controller and a content server, if the content is absent at the second base station.

6. The method of claim 1, further comprising identifying the set of base stations based on at least one of an estimated trajectory of the mobile station and a historical data of at least one of the mobile station, the first base station and the second base station.

7. The method of claim 1, wherein the content belongs to a set of popular content on the Internet.

8. The method of claim 1, wherein the content includes at least one of a media file, a text file, a binary file, an ASCII file, an HTML file and a web content.

9. A method of transmitting a content to a mobile station in response to a handover of the mobile station from a first base station to a second base station, the method comprising:
    receiving a tag index corresponding to a last packet transmitted to the mobile station from the first base station, the last packet belonging to a first group of packets of the content transmitted to the mobile station from the first base station;
    identifying a second group of packets of content based on the tag index, wherein the second group of packets being subsequent to the first group of packets in the content; and
    transmitting the second group of packets of the content from the second base station to the mobile station.

10. The method of claim 9, wherein receiving the tag index includes receiving the tag index from at least one of the first base station and a central controller.

11. A system for transmitting a content in a wireless communication network, the system comprising:
    a caching module, the caching module configured to cache the content in a first base station of a set of base stations in the wireless communication network, the content including a plurality of packets;

a first transmitting module, the transmitting module transmitting a first group of packets of the content from the first base station to a mobile station, the first group of packets belonging to the plurality of packets of the content;

a handover module, the handover module configured to handover the mobile station to a second base station, the second base station belonging to the set of base stations, to tag the first group of packets transmitted to the mobile station, and to convey a tag index to at least the second base station, the tag index corresponding to an index of a last packet of the first group of packets transmitted to the mobile station; and a second transmitting module, the second transmitting module configured to resume transmission of a second group of packets of the content from the second base station to the mobile station, the second group of packets belonging to the plurality of packets.

12. The system of claim 11, wherein the caching module is further configured to assign a plurality of indices to the plurality of packets of the content, wherein an index of a packet corresponds to a sequence number of the packet in the plurality of packets.

13. The system of claim 11, wherein the handover module is further configured to:
   send the tag index to a central controller; and
   forward the tag index from the central controller to at least the second base station.

14. The system of claim 11, wherein the second transmitting module is configured to identify the group of second packets subsequent to the group of first packets based on the tag index.

15. The system of claim 11, wherein the content is retrieved from at least one of the first base station, a central controller and a content server, if the content is absent at the second base station.

16. The system of claim 11, wherein the system further comprises an identifying module, the identifying module configured to identify the set of base stations based on at least one of an estimated trajectory of the mobile station and a historical data of at least one of the mobile station, the first base station and the second base station.

* * * * *

UNITED STATES PATENT AND TRADEMARK OFFICE
CERTIFICATE OF CORRECTION

PATENT NO. : 8,134,970 B2
APPLICATION NO. : 11/951342
DATED : March 13, 2012
INVENTOR(S) : Rehan Jalil and Mustafa Ergen It is certified that error appears in the above-identified patent and that said Letters Patent is hereby corrected as shown below:

Column 10, Claim 9, line 54 delete "wherein".

Signed and Sealed this
Twenty-ninth Day of May, 2012

David J. Kappos
*Director of the United States Patent and Trademark Office*